United States Patent [19]

Matsuda et al.

[11] Patent Number: 4,668,850
[45] Date of Patent: May 26, 1987

[54] HIGH FREQUENCY INDUCTION HEATING DEVICE FOR BRAKE SHOE LINING

[75] Inventors: Osamu Matsuda, Tokyo; Isao Sasajima, Saitama, both of Japan

[73] Assignee: Akebono Brake Industry Co. Ltd., Tokyo, Japan

[21] Appl. No.: 814,093

[22] Filed: Dec. 27, 1985

[30] Foreign Application Priority Data

Dec. 27, 1984 [JP] Japan ................................ 59-275184

[51] Int. Cl.$^4$ .............................................. H05B 6/10
[52] U.S. Cl. ............................ 219/10.57; 219/10.67; 219/10.79; 29/233; 156/380.2
[58] Field of Search ............... 219/10.57, 10.43, 10.53, 219/9.5, 10.69, 10.71, 10.79, 10.67; 156/379.6, 379.7, 379.8, 380.2, 272.2, 274.2; 188/250 G; 29/233

[56] References Cited

U.S. PATENT DOCUMENTS

| | | | |
|---|---|---|---|
| 2,365,021 | 12/1944 | Strickland, Jr. | 219/10.79 X |
| 4,119,825 | 10/1978 | Taylor et al. | 219/10.57 X |
| 4,174,994 | 11/1979 | Savelkouls | 219/10.57 X |
| 4,409,455 | 10/1983 | Belcher et al. | 219/10.57 X |

*Primary Examiner*—Philip H. Leung
*Attorney, Agent, or Firm*—Toren McGeady Goldberg

[57] ABSTRACT

In a high frequency induction heating device for a brake shoe lining, a high frequency induction heating coil is arranged to extend zigzag in a curved shape along the inner circumferential surface of the rim of a brake shoe body from one end to the other thereof and is opposed to the inner circumferential surface of the rim; at least three carrying rods are arranged to have their one ends discretely connected to two ends of each of the curved parts and to the middle of the length of the curved part of the coil on their one sides respectively while the other ends of the carrying rods are connected to a fixed supporting member; and the curvature of the curved part of the coil is variable by adjusting the lengths of the carrying rods.

3 Claims, 3 Drawing Figures

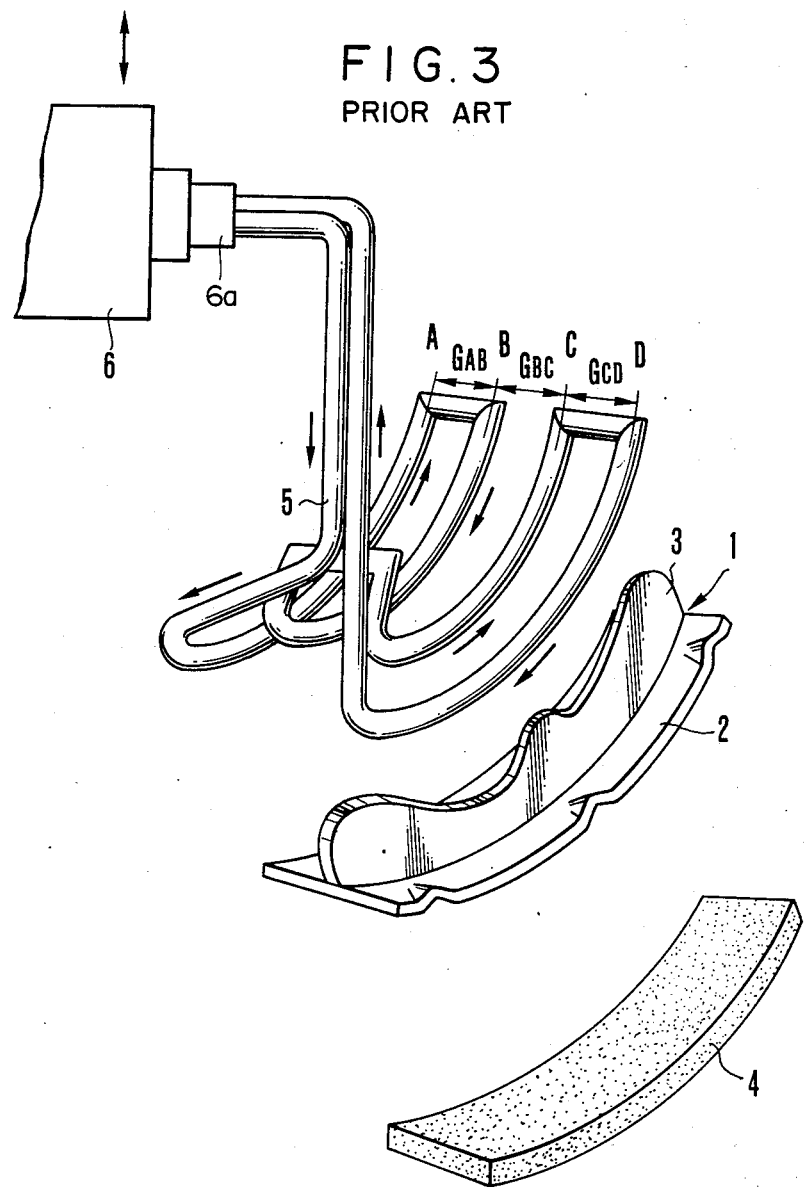

HIGH FREQUENCY INDUCTION HEATING DEVICE FOR BRAKE SHOE LINING

FIELD OF THE INVENTION AND RELATED ART STATEMENT

This invention relates to a high frequency induction heating device for a brake shoe lining arranged to fasten, by a high frequency heating process, a shoe lining to the outer circumferential surface of the rim of a shoe body which is formed by the rim and a web with the rim and the web cemented together in a T sectional shape in an arcuate brake shoe serving as an essential component of a drum brake.

According to the conventional method for the manufacture of a brake shoe to be used for a drum brake, a shoe body which is normally made of a metal and a shoe lining which is obtained by forming an organic or inorganic material into a predetermined shape are glued to each other via a layer of a thermosetting resin; and then the shoe thus obtained is subjected to a heating treatment which is carried out by placing it within an open type heating furnace with the shoe kept in the glued state by means of a large holding tool.

However, this method requires not only the use of a large furnace but also a long period of time for the heating treatment. This has presented a problem in terms of improvement in productivity.

To solve this problem, there has been proposed a heating device which is arranged in a manner as shown in FIG. 3 of the accompanying drawings. The illustration includes a shoe body 1 consisting of a rim 2 which is made of an arcuately curved plate and a web 3 which is perpendicularly secured to the middle of the width of the inner circumferential surface of the rim 2 and extends along the circumferential surface of the rim. An adhesive layer of a thermosetting resin is interposed in between the outer circumferential surface of the rim 2 and the inner circumferential surface of a shoe lining 4. The shoe lining 4 is thus glued to the rim 2 via the adhesive layer. A high frequency coil 5 is provided with curved parts A, B, C and D which continue in a zigzag manner along the inner circumferential surface of the rim 2. The coil is closely opposed to the inner circumferential surface of the rim 2 and is arranged to heat it in that state. This arrangement of the coil is intended to concentrate a heating effect on the whole surface of the rim 2 while leaving the web 3 not much heated. A current flows through the curved parts A and B or parts C and D in opposite directions. However, with the parts A and B (or the parts C and D) sufficiently spaced at a distance GAB, or GCD, the magnetic fields produced by the opposite flows of the current can be prevented from being offset by each other. Therefore, the rim surface is assured of having sufficient magnetic flux action thereon. Meanwhile the curved parts B and C are spaced at a shorter distance GBC for the purpose of causing the magnetic fluxes acting on the web 3 to be offset by each other and thus to be suppressed while the current is flowing through them in the opposite directions. More specifically, since the shoe body 1 is usually made of iron, the whole surface of the rim 2 is arranged to be uniformly heated by having an alternating magnetic field of high frequency uniformly act on the surface of the rim 2. With the rim 2 heated in this manner, the whole adhesive layer can be uniformly heated and thus the shoe lining can be effectively prevented from peeling off the rim 2.

However, in the high frequency induction heating device of this kind, the curved parts of the high frequency coil 5 is preformed to coincide with the curved surface of the rim 2. Therefore, in the event of heating another rim 2 which has a different radius of curvature, either an external force must be applied to the high frequency coil to change the shape thereof and the gap between the inner circumferential surface and the coil 5 must be adjusted accordingly. Therefore, this has necessitated additional work for the modification of the shape of the coil 5.

Further, in the prior art device, the base end part of the coil 5 is secured to the current take out terminal 6a of the high frequency power source 6. In cases where the high frequency coil is arranged to have many curved parts for the purpose of simultaneously heating many shoe bodies 1, therefore, the weight imposed on the base end part of the coil tends to become excessive and thus might come to cause deformation of the base end part.

OBJECT AND SUMMARY OF THE INVENTION

This invention is directed to the solution of the above-stated problems of the prior art devices. It is therefore an object of this invention to provide a high frequency induction heating device which is arranged to facilitate adjustment of the gap between the curved part of the high frequency coil and the brake shoe.

It is another object of this invention to provide a high frequency induction heating device wherein the base end part of a high frequency coil is prevented from being deformed with the high frequency coil secured to a high frequency power source or the like through supporting means.

To attain these objects, a high frequency induction heating device for a brake shoe lining embodies this invention in the following manner: a high frequency induction heating coil is arranged to extend zigzag in a curved shape along the inner circumferential surface of the rim of a brake shoe body from one end to the other end thereof and is opposed to the inner circumferential surface of the rim; three carrying rods are arranged to have their ends discretely connected to two ends of each of the curved parts and to the middle of the length of the curved part of the coil on their one side respectively while the other ends of the carrying rods are connected to a fixed supporting member; and the curvature of the curved part of the coil is variable by adjusting the effective length of the carrying rods.

These and further objects and features of this invention will become apparent from the following detailed description of preferred embodiments thereof taken in connection with the accompanying drawings.

BRIEF DESCRIPTION OF THE DRAWINGS

FIG. 3 is an oblique view showing the arrangement of the conventional heating device.

DETAILED DESCRIPTION OF THE PREFERRED EMBODIMENTS

Figure 1:
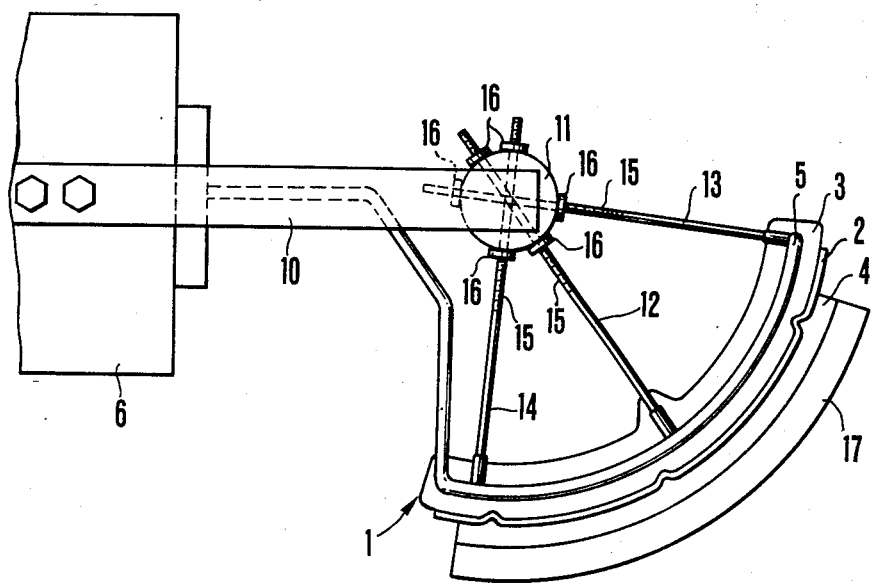
FIG. 1 is a sectional view showing a heating device arranged according to this invention as an embodiment example thereof.

Referring to FIG. 1 which shows a heating device as an embodiment example of this invention, a coil fixing plate 10 is made of Bakelite and is secured to a high frequency power source 6. The high frequency power source 6 is mounted on raising and lowering means attached to a pnuematic cylinder or the like which is not shown. A support member 11 which is made of Bakelite in a solid cylindrical shape is arranged to allow carrying rods to be inserted into and secured thereto. One end face of the support member 11 is secured to the inner wall of the extended end of the coil fixing plate 10. An intermediate carrying rod 12 is connected approximately to the middle point of the length of each of the curved parts of a high frequency coil 5.

An upper carrying rod 13 is connected to the upper end of the curved part of the coil 5. A lower carrying rod 14 is connected to the lower end of the curved part. The other ends of these carrying rods are inserted into the above-stated support member 11 and secured to the member 11 with nuts 16 tightened on their thread parts 15. The spanned stretches of these carrying rods 12, 13 and 14 are adjustable on the side of the support member 11 by the combination of the thread parts 15 and the nuts 16. A receiving base 17 is made of an elastic material and is arcuately arranged to have its inner surface coincide with the outer circumferential shape of a shoe lining 4. Pressing engagement claws which are not shown are arranged to come into engagement with a rim 2. Then, the rim 2 comes to carry the shoe lining 4 through an adhesive of a thermosetting resin which is applied to the outer circumferential surface of the rim 2. The carrying rods are preferably made of a material which is of a low thermal conductivity and is arranged to have no adverse effect on the heat generated by the coil.

The carrying rods 12, 13 and 14 are length adjustably secured to the support member 11 by means of the nuts 16 as mentioned above. Therefore, the curvature of the curved parts of the high frequency coil 5 can be changed as desired by pulling or pushing the carrying rods 12, 13 and 14 toward or away from the support member 11 against the resilience of the high frequency coil 5 by adjusting the positions of the nuts 16. In the event that a rim 2 of different curvature is to be heated, therefore, a gap between the curved part of the high frequency coil 5 and the inner circumferential surface of the rim 2 can be uniformalized all over the surface of the rim 2 by adjusting the positions of the nuts 16 to pull up or push down the carrying rods 12, 13 and 14.

The high frequency coil 5 is secured via the carrying rods 12, 13 and 14 to the fixed plate 10 which is secured to the high frequency power source 6 as mentioned in the foregoing. Therefore, no excessive weight is imposed on the base end part of the high frequency coil 5, so that the base end part can be prevented from being deformed by an excessive weight.

Figure 2:
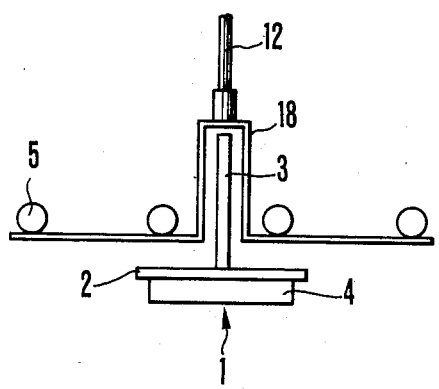
FIG. 2 is a sectional view showing a modification of the embodiment shown in FIG. 1.

In the embodiment shown in FIG. 1, the carrying rods 12, 13 and 14 are connected to each of the curved parts of the high frequency coil 5 which continuously extend in a serpentine arrangements or zigzag manner. Whereas, in the case of another embodiment example which is shown in FIG. 2, a bridging member 18 is arranged to carry each of the curved parts of the coil 5 and to straddle the web 3 of the shoe body 1; and the above-stated carrying rods 12, 13 and 14 are connected to this bridging member 18.

In this case, compared with the preceding embodiment example, the number of the carrying rods can be reduced to a smaller number by virtue of the arrangement to connect the carrying rods to the bridging member 18.

In accordance with this invention, as mentioned in the foregoing, the gap between the high frequency coil and the inner surface of the rim of a brake shoe is readily adjustable even in the event of heating rims of different curvatures. Therefore, a great advantage is obtainable from the practical applications of this invention.

We claim:

1. A high frequency induction heating device comprising a high frequency inducion heating coil extending in a serpentine arrangement in a curved shape along an innner circumferential surface of a rim of a brake shoe body from one end to another thereof and in a state of being opposed to the inner circumferential surface of said rim, and at least three carrying rods arranged to have their ends discretely connected to two ends of each of curved parts and to a middle of the length of a curved part of said coil on one side thereof respectively with other ends of said carrying rods being connected to a fixed support member secured to a high frequency power source which is arranged to supply electric energy to said high frequency induction heating coil so as to extend radially from said support member; the curvature of said curved part of said coil is variable by adjusting the lengths of said carrying rods.

2. A device according to claim 1, further comprising means for individually adjusting the length by which each of said carrying rods extends radially from said support member in order thereby to adjust the curvature of said coil.

3. A device according to claime 2, wherein said adjusting means comprise threads on said carrying rods and nuts engaging said threads which connect said carrying rods to said support member.

* * * * *